(12) United States Patent
Delpech et al.

(10) Patent No.: US 12,073,245 B2
(45) Date of Patent: Aug. 27, 2024

(54) METHOD FOR MANAGING A PLURALITY OF TASKS BY A MULTICORE MOTOR VEHICLE PROCESSOR

(71) Applicants: CONTINENTAL AUTOMOTIVE FRANCE, Toulouse (FR); CONTINENTAL AUTOMOTIVE GMBH, Hanovre (DE)

(72) Inventors: Franck Delpech, Toulouse (FR); Stéphane Eloy, Tournefeuille (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 441 days.

(21) Appl. No.: 16/954,978

(22) PCT Filed: Dec. 11, 2018

(86) PCT No.: PCT/FR2018/053179
§ 371 (c)(1),
(2) Date: Jun. 17, 2020

(87) PCT Pub. No.: WO2019/122588
PCT Pub. Date: Jun. 27, 2019

(65) Prior Publication Data
US 2020/0310870 A1    Oct. 1, 2020

(30) Foreign Application Priority Data

Dec. 19, 2017   (FR) ........................................ 1762449

(51) Int. Cl.
*G06F 9/48* (2006.01)
*G06F 9/46* (2006.01)
*G06F 9/50* (2006.01)

(52) U.S. Cl.
CPC .............. *G06F 9/4881* (2013.01); *G06F 9/46* (2013.01); *G06F 9/461* (2013.01); *G06F 9/48* (2013.01);
(Continued)

(58) Field of Classification Search
CPC ........ G06F 9/48; G06F 9/4806; G06F 9/4843; G06F 9/485; G06F 9/4881; G06F 9/50; G06F 9/5027; G06F 9/46; G06F 9/461
See application file for complete search history.

(56) References Cited

U.S. PATENT DOCUMENTS

2010/0088706 A1 *   4/2010  Dong ................... G06F 9/4887
                                                         718/103
2012/0137298 A1 *   5/2012  Periorellis ........ G06Q 10/06313
                                                         718/102

(Continued)

FOREIGN PATENT DOCUMENTS

| CN | 103885826 A | 6/2014 |
| CN | 107463391 A | 12/2017 |
| WO | 2014/072628 A1 | 5/2014 |

OTHER PUBLICATIONS

Shin et al, "A Reservation-Based Algorithm for Scheduling Both Periodic and Aperiodic Real-Time Tasks", IEEE Transactions on Computers, vol. 44, No. 12, Dec. 1995, pp. 1405-1419 (Year: 1995).*

(Continued)

*Primary Examiner* — Charles M Swift
(74) *Attorney, Agent, or Firm* — NIXON & VANDERHYE

(57) ABSTRACT

Disclosed is a method for managing a plurality of tasks of a one-off function implemented by a motor vehicle computer, the computer including a microcontroller, the microcontroller, termed a "multicore" microcontroller, including a plurality of cores, each of which is capable of processing (Continued)

regular functions and one-off functions, each one-off function including a plurality of tasks to be executed, each of which is identified by an identifier, the method including, during the processing of the tasks of a one-off function, each time a core of the plurality of cores is available to process a task, a step of the available core selecting, from a predetermined ordered list of identifiers of the tasks of the one-off function, the identifier of the first task which has not yet been processed by the other cores, and a step of the available core processing the task that corresponds to the selected identifier.

8 Claims, 3 Drawing Sheets

(52) U.S. Cl.
CPC .......... *G06F 9/4806* (2013.01); *G06F 9/4843* (2013.01); *G06F 9/485* (2013.01); *G06F 9/50* (2013.01); *G06F 9/5027* (2013.01)

(56) References Cited

U.S. PATENT DOCUMENTS

| | | | | |
|---|---|---|---|---|
| 2014/0059553 A1* | 2/2014 | Chandhoke | ............... | G06F 9/52 718/102 |
| 2014/0351819 A1* | 11/2014 | Shah | ............... | G06F 9/4881 718/103 |
| 2018/0039514 A1* | 2/2018 | Liao | ............... | G06F 9/4837 |

OTHER PUBLICATIONS

Saha et al, Co-Scheduling Persistent Periodic and Dynamic Aperiodic Real-Time Tasks on Reconfigurable Platforms:, IEEE Transactions on Multi-Scale Computing Systems, vol. 4, No. 1, Jan.-Mar. 2018, pp. 51-54 (Year: 2018).*

International Search Report, dated Mar. 20, 2019, from corresponding PCT application No. PCT/FR2018/053179.

Tumeo et al.; A Dual-Priority Real-Time Multiprocessor System on FPGA for Automotive Applications; 2008 Design, Automation and Test in Europe; Mar. 10, 2008; pp. 1039-1044; Munich, Germany.

Banús et al.; Dual Priority Algorithm to Schedule Real-Time Tasks in a Shared Memory Multiprocessor; Parallel and Distributed Processing; Apr. 22, 2003; pp. 112-119; Piscataway, NJ, USA.

Giannopoulou et al.; Scheduling of Mixed-Criticality Applications on Resource-Sharing Multicore Systems; 2013 Proceedings of the International Conference on Embedded Software (EMSOFT); Sep. 29, 2013; pp. 1-15.

Office Action issued in Chinese Patent Application No. 201880081854.3 dated Dec. 22, 2022.

* cited by examiner

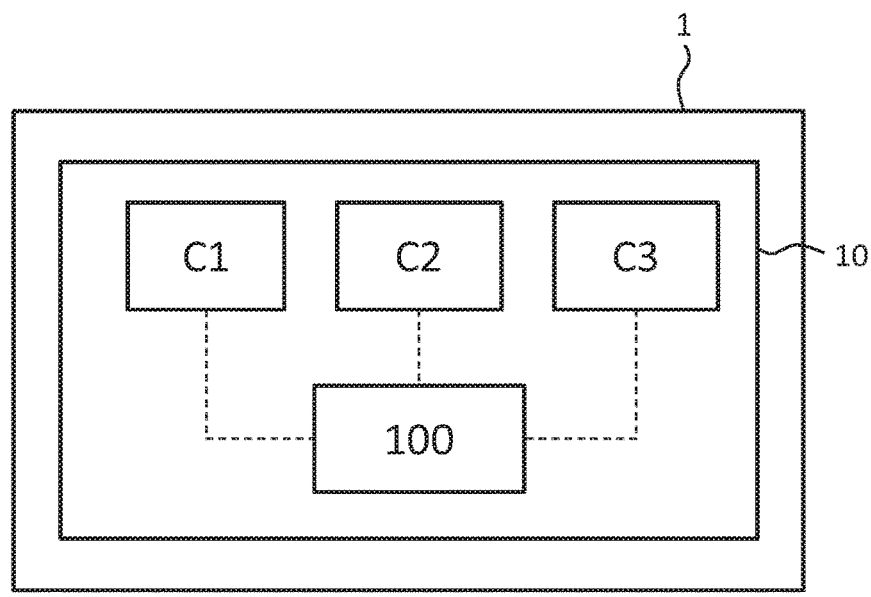
FIGURE 2
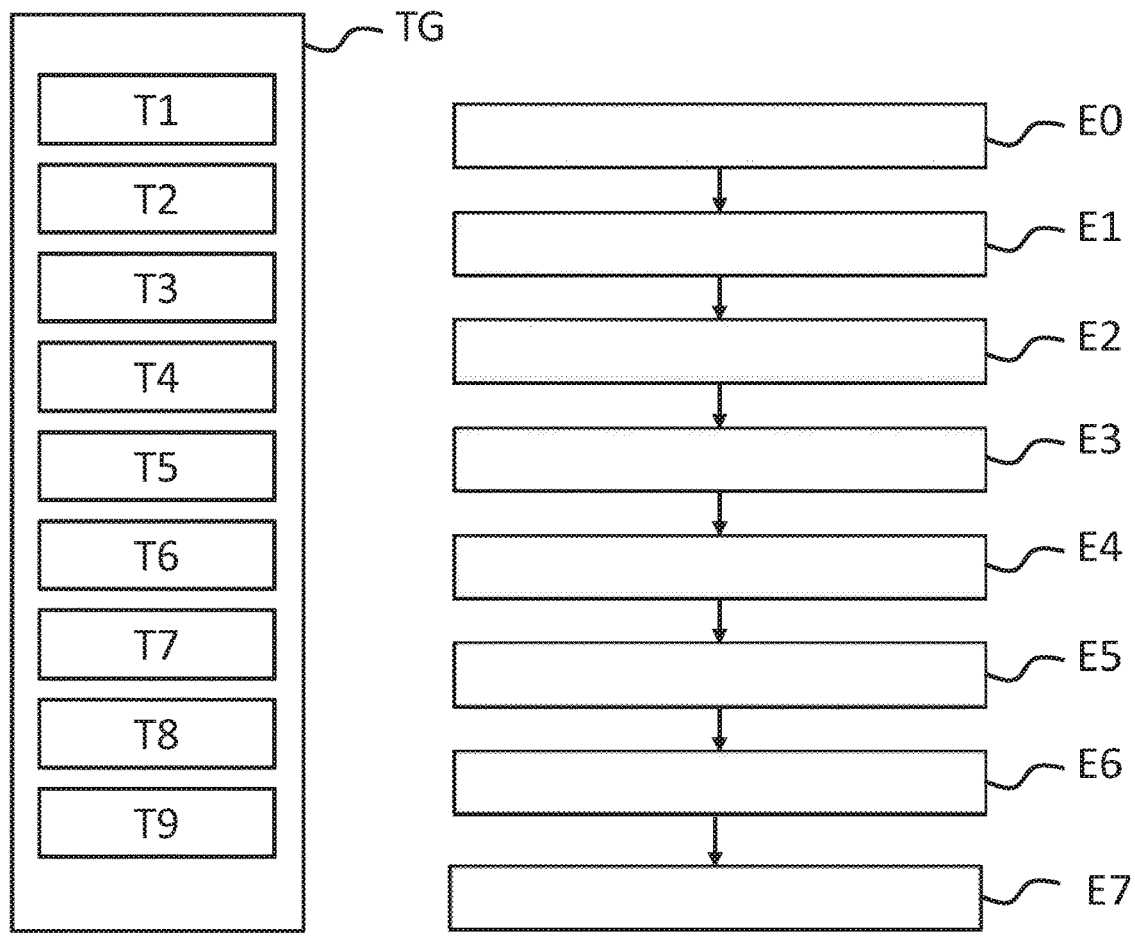
FIGURE 3
FIGURE 4

METHOD FOR MANAGING A PLURALITY OF TASKS BY A MULTICORE MOTOR VEHICLE PROCESSOR

BACKGROUND OF THE INVENTION

Field of the Invention

The present invention relates to the field of onboard computers in motor vehicles and relates more particularly to a method for an onboard multicore microcontroller in a motor vehicle to manage a plurality of tasks.

Description of the Related Art

As is known, a motor vehicle nowadays includes a plurality of computers used for executing various functions such as, in particular, controlling the engine or motor of the vehicle. Each computer comprises at least one processor or microcontroller which executes one or more items of software in order to perform the desired functions.

A item of software defines a plurality of functions which are executed in a specific order or according to the input data received or the output data generated.

When an item of software is run on a processor or microcontroller which has a plurality of cores, the functions are processed in parallel on the different cores. To this end, each function is divided into a plurality of tasks, each task being executed by one of the cores.

Some functions, termed "regular" functions, for example related to managing fuel injection, are executed regularly, for example every 10 or 100 ms, while other functions, termed "one-off" functions, are executed asynchronously when one-off events occur.

Initialization functions, for example the function executed when starting up the software, are considered to be one-off functions and are processed as such. By way of example, it may be necessary to implement a transition function when certain notable events are detected, such as the change in the position of the ignition key or the activation or deactivation of the engine or motor of the vehicle.

When such a one-off event occurs, it is necessary to put the execution of all regular functions on hold across all of the cores in order to process the one-off initialization or transition function required for this event. In other words, until the processing of the one-off function has ended, the cores execute no other regular function.

A one-off initialization or transition function comprises a plurality of tasks which are run in parallel on the different cores, each core being responsible for some of the tasks. The distribution of these tasks between the different cores is predetermined, for example in the factory or when the software is generated, and is stored in a memory region of the microcontroller. In other words, the distribution of tasks and of one-off functions is static and is therefore always performed in the same way over the service life of the software.

By way of example, FIG. 1 shows the processing of three regular functions F1, F2, F3 by three cores C1, C2, C3, respectively, which is interrupted at a time $t_1$ by the implementation of a one-off initialization or transition function FS that includes nine tasks T1, T2, T3, T4, T5, T6, T7, T8, T9. The distribution of the tasks T1, T2, T3, T4, T5, T6, T7, T8, T9 is predetermined such that the first core C1 processes tasks T1, T4 and T7, the second core C2 processes tasks T2, T5 and T8 and the third core C3 processes tasks T3, T6 and T9.

The return to the regular functions may thus occur only once the last task has been completed at a time $t_2$ by the core which implements it, in this instance task T7 implemented by the first core C1.

To optimize the static distribution of the tasks of a one-off function, it is known practice to distribute the tasks beforehand such that the cores C1, C2, C3 finish their last task at times close to one another.

However, since the processing speed of the cores may vary and since this optimization operation is not always performed or is not possible for want of relevant and representative measurements, in practice a core might process its last task well after the respective last tasks of the other cores, these cores being idle for this time, which may slow down the operation of the software significantly and make this system less responsive.

SUMMARY OF THE INVENTION

There is therefore a need for a solution that optimizes the distribution of tasks in real time so as to decrease the processing time for singular functions and thus make the system as responsive as possible.

To this end, one subject of the invention is a method for managing a plurality of tasks of a one-off function implemented by a motor vehicle computer, said computer comprising a microcontroller, said microcontroller, termed a "multicore" microcontroller, comprising a plurality of cores, each of which is capable of processing regular functions and one-off functions, each one-off function including a plurality of tasks to be executed, each of which is identified by an identifier. Said method is noteworthy in that it comprises, during the processing of the tasks of a one-off function, each time a core of the plurality of cores is available to process a task, a step of said available core selecting, from a predetermined ordered list of identifiers of the tasks of the one-off function, the identifier of the first task which has not yet been processed by the other cores, and a step of said available core processing the task that corresponds to the selected identifier.

The method according to the invention thus makes it possible to automatically balance, when executing the software, the load on the cores of the microcontroller in the initialization and transition phases.

Preferably, the one-off function is an initialization function or a transition function between two states of the engine or motor of the vehicle.

According to one aspect of the invention, the method further comprises, prior to the selection step, the steps of the plurality of cores of the microcontroller processing a plurality of regular functions, detecting a trigger event for the one-off function and, following said detection, putting the processing of the plurality of regular functions by the plurality of cores on hold.

According to one feature of the invention, the selection step is carried out by a management function that is common to all of the cores.

Advantageously, the common management function uses a binary variable (or "flag") for each task to indicate the state of handling of said task by one of the cores.

Preferably, the common management function uses an atomic function (i.e. an uninterruptable function) to manage the updating of the binary variable associated with each task. Thus, on starting the processing of the one-off function, each core executes this common management function. The first core which executes the atomic function associated with the first task locks the associated binary variable (flag) (for example by switching the binary value from 0 to 1) and thus makes this first task inaccessible to the other cores. When the second core reads the binary variable associated with the first task and notices that its value is 1, it then tests the binary variable associated with the second task. If no other core has yet taken charge of the second task, then the second core locks the associated binary variable and thus makes this second task inaccessible to the other cores. This continues for the other cores and the processing of the other tasks which make up the one-off function.

Advantageously, the method further comprises a step of initializing the binary variables prior to the execution of the one-off function.

Preferably, the method further comprises a step of detecting the end of execution of the task relating to the last identifier in the predetermined ordered list by one of the cores of the plurality of cores.

Again preferably, the method further comprises, following the step of detecting the end of execution of the task relating to the last identifier in the predetermined ordered list, a step of the plurality of cores of the microcontroller returning to the processing of the plurality of regular functions.

According to one aspect of the invention, the method comprises a preliminary step of determining the ordered list of identifiers of the tasks of the one-off function.

Advantageously, the method further comprises a step of storing the predetermined ordered list in a memory region of the computer.

The invention also relates to a computer for a motor vehicle, said computer comprising a microcontroller, said microcontroller, termed a "multicore" microcontroller, comprising a plurality of cores, each of which is capable of processing regular functions and one-off functions, each one-off function including a plurality of tasks to be executed, each of which is identified by an identifier. Said computer is noteworthy in that, during the processing of the tasks of a one-off function, each time a core of the plurality of cores is available to process a task, said available core is capable of selecting, from a predetermined ordered list of identifiers of the tasks of the one-off function, the identifier of the first task which has not yet been processed by the other cores, and to process said task that corresponds to the selected identifier.

Advantageously, the computer comprises a memory region in which the predetermined ordered list of identifiers of the tasks of the one-off function is stored.

Again advantageously, the computer is capable of commanding the processing of a plurality of regular functions by the plurality of cores of the microcontroller, of detecting a trigger event for the one-off function and, following said detection, of putting the processing of the plurality of regular functions by the plurality of cores on hold.

Preferably, the computer is capable of commanding the execution, by each core, of a predetermined task from the predetermined ordered list.

Lastly, the invention relates to a motor vehicle comprising a computer such as presented above.

BRIEF DESCRIPTION OF THE DRAWINGS

FIG. 2 schematically illustrates one embodiment of the computer according to the invention.

FIG. 3 illustrates one example of an ordered list of identifiers of tasks relating to a one-off function.

FIG. 4 schematically illustrates one embodiment of the method according to the invention.

DESCRIPTION OF THE PREFERRED EMBODIMENTS

Figure 1:
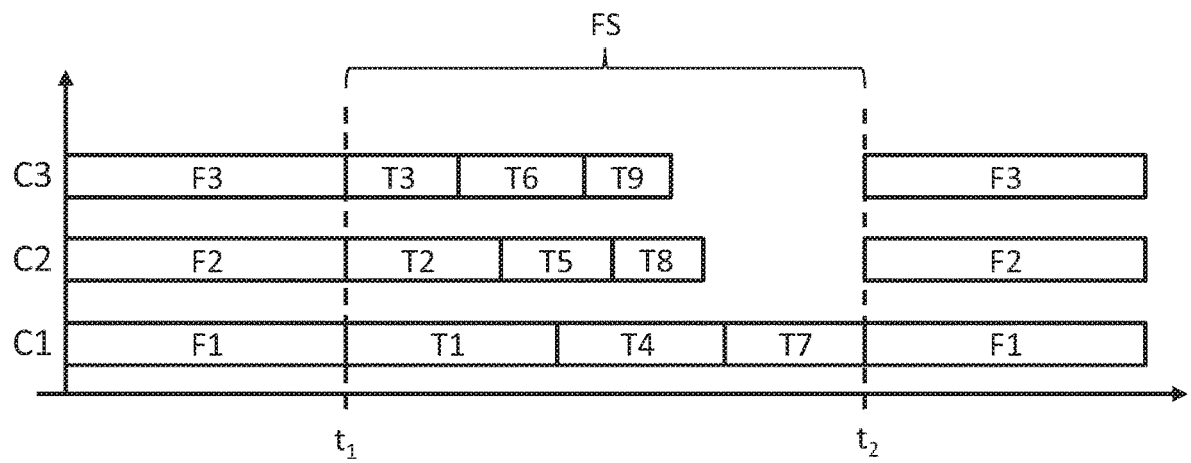
FIG. 1 (mentioned above) illustrates one example of the static distribution of tasks according to the prior art.

The invention is intended to be implemented by a multi-core processor or microcontroller of an onboard computer in a motor vehicle in order to manage the tasks relating to the operation of the vehicle, in particular of its one or more engines or motors.

To illustrate the present invention, FIG. 2 schematically shows a computer 1 comprising a microcontroller 10. The microcontroller 10 comprises three cores C1, C2, C3 and a memory region 100.

It should be noted that the invention could equally be implemented by a microcontroller or processor that includes two or more than three cores. Similarly, as a variant, it should be noted that the memory region 100 could be external to the microcontroller and be located in another part of the computer 1, or even outside the computer 1.

In a multicore microcontroller 10, each core C1, C2, C3 is configured to sequentially process tasks, which are each characterized by an identifier T1, T2, T3, T4, T5, T6, T7, T8, T9.

The implementation of nine tasks by the three cores C1, C2, C3 is illustrated hereinafter, but it goes without saying that the number of tasks could be smaller or greater than nine.

These tasks are defined in an item of software (or program), which is stored in the memory region 100, and allow the functions necessary for the operation of the vehicle to be implemented.

Among these functions, there are regular functions, which are for example implemented periodically, every 10 or 100 ms, and related to controlling the one or more engines or motors of the vehicle, and one-off functions, which occur asynchronously and are related to operations for initializing or for transitioning between different states.

By way of example, initialization of the microcontroller may be required when the software starts or restarts, for example in the event of a runtime error or electromagnetic interference. Still by way of example, a transition function is required when there is a change in the state of the ignition key or when the engine or motor is activated or deactivated.

When an event that requires the activation of a one-off function occurs, it is necessary to put the processing of the tasks associated with the regular functions on hold for all of the cores of the microcontroller 10 in order to process the tasks of the required one-off function, which is higher priority than a regular function.

According to the invention, an ordered and predetermined list of task identifiers is stored in the memory region 100 for each one-off function, each core C1, C2, C3 of the microcontroller 10 then being configured, following the detection of a one-off event that requires a determined one-off function to be triggered and each time said core C1, C2, C3 is available, to select, from the ordered list of identifiers of the tasks relating to the determined one-off function, the identifier of the first task which has yet been processed by another core C1, C2, C3 and to process said selected task.

The invention will now be described in terms of the implementation thereof with reference to FIGS. 3 to 6.

As a prerequisite, it is assumed that the ordered list of task identifiers has already been determined.

In a step E0, each core C1, C2, C3 is implementing a regular function F1, F2, F3 (or is idle without a function to implement).

In a step E1, a one-off event ES occurs, requiring the immediate implementation of an associated one-off function, for example an initialization or transition function.

In a step E2, the execution of the regular functions is put on hold to allow the execution of the tasks of the one-off function FS that is to be implemented following the detection of the one-off event ES.

In a step E3, the values of the indicators of each task on the list are initialized, for example by setting them to zero.

Next, in a step E4, one and the same common task, termed the common management task TG (FIG. 6) is executed by the three cores C1, C2, C3 in order for each core C1, C2, C3 to select, from the ordered list of identifiers of the tasks relating to the associated one-off function, illustrated in FIG. 3, an identifier of the next task on the list which has not yet been selected by another core C1, C2, C3, as will be described below.

It should be noted that, optionally, the one-off function FS may also include what are called "fixed" tasks (not shown) TF1, TF2 and TF3, which may be empty (i.e. require no processing), which must imperatively be run on a particular core C1, C2, C3 (for example for reasons of memory protection between the cores) before the implementation of the dynamic tasks T1, T2, T3, T4, T5, T6, T7, T8, T9. Task TF1 may thus represent the fixed task of the one-off function FS associated with the first core C1, task TF2 the fixed task of the one-off function FS associated with the second core C2 and task TF3 the fixed task of the one-off function FS associated with the third core C3. These fixed tasks TF1, TF2, TF3, i.e. those linked to a core C1, C2, C3, do not appear in the list of task identifiers and are thus not managed by the common management function. However, they will be carried out before the common management function starts. In the case that the one-off function FS includes fixed tasks TF1, TF2, TF3, the initialization (step E3) of the indicators associated with tasks T1, T2, T3, T4, T5, T6, T7, T8, T9 is carried out before the execution of the fastest of the fixed tasks TF1, TF2 or TF3. Additionally, in this case, the common management function will be able to be activated by the core C1, C2, C3 which is the first to complete the implementation of its fixed task so as to optimize the implementation and management of tasks T1, T2, T3, T4, T5, T6, T7, T8, T9.

Figure 5:
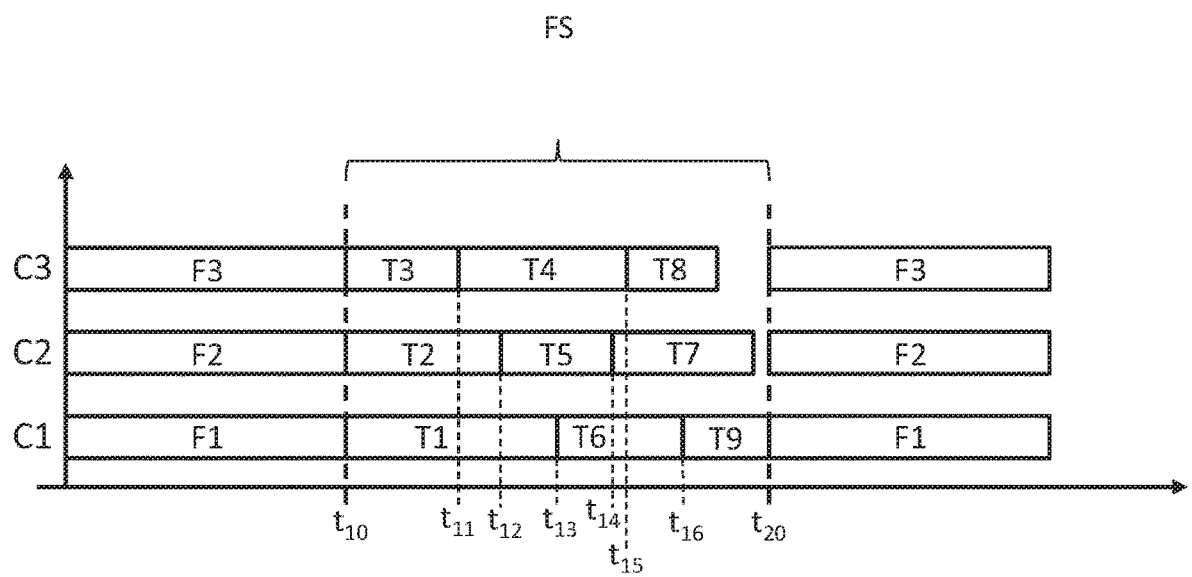
FIG. 5 illustrates one example of the dynamic distribution of tasks according to the invention.

In the example of FIG. 5, at the start, the first core C1 selects the first identifier from the ordered list of identifiers of the tasks relating to the associated one-off function, and starts to execute the corresponding task T1 at a time $t_{10}$. At the same time, the second core C2 selects the second identifier from the ordered list of identifiers of the tasks relating to the associated one-off function, and starts to execute the corresponding task T2 at time $t_{10}$. At the same time, the third core C3 selects the third identifier from the ordered list of identifiers of the tasks relating to the associated one-off function, and starts to execute the corresponding task T3 at time $t_{10}$. It goes without saying that any other scheme for initially allocating tasks to the cores C1, C2, C3 could be used (for example, the third core C3 could process task T1 first while the second core C2 would process task T3 and the first core C1 would process task T2). Next, the core C1, C2, C3 which finishes executing task T1, T2, T3 first will select (step E4) and execute (step E5) the task of which the next identifier is stored in the ordered list after the identifiers of the tasks selected previously and hence of the tasks which have already been processed.

In practice, as mentioned above, each core C1, C2, C3 will execute one and the same common task, termed the common management task TG (FIG. 6), which is configured to run through the ordered list and select the first identifier T1, T2, T3, T4, T5, T6, T7, T8, T9 of which the task has not yet been taken on by one of the cores C1, C2, C3. To this end, an indicator, for example a binary variable ("flag") associated with each task (named flag_ti where i is a natural integer between 1 and 9 in this example), may advantageously be used to signal that an identifier has already been selected by one of the cores. For example, each identifier on the list may be associated with an indicator that takes a value of 0 when the identifier has not been selected (i.e. when the corresponding task has not yet been taken on by one of the cores C1, C2, C3) and a value of 1 when the identifier has already been selected by one of the cores C1, C2, C3.

Figure 6:
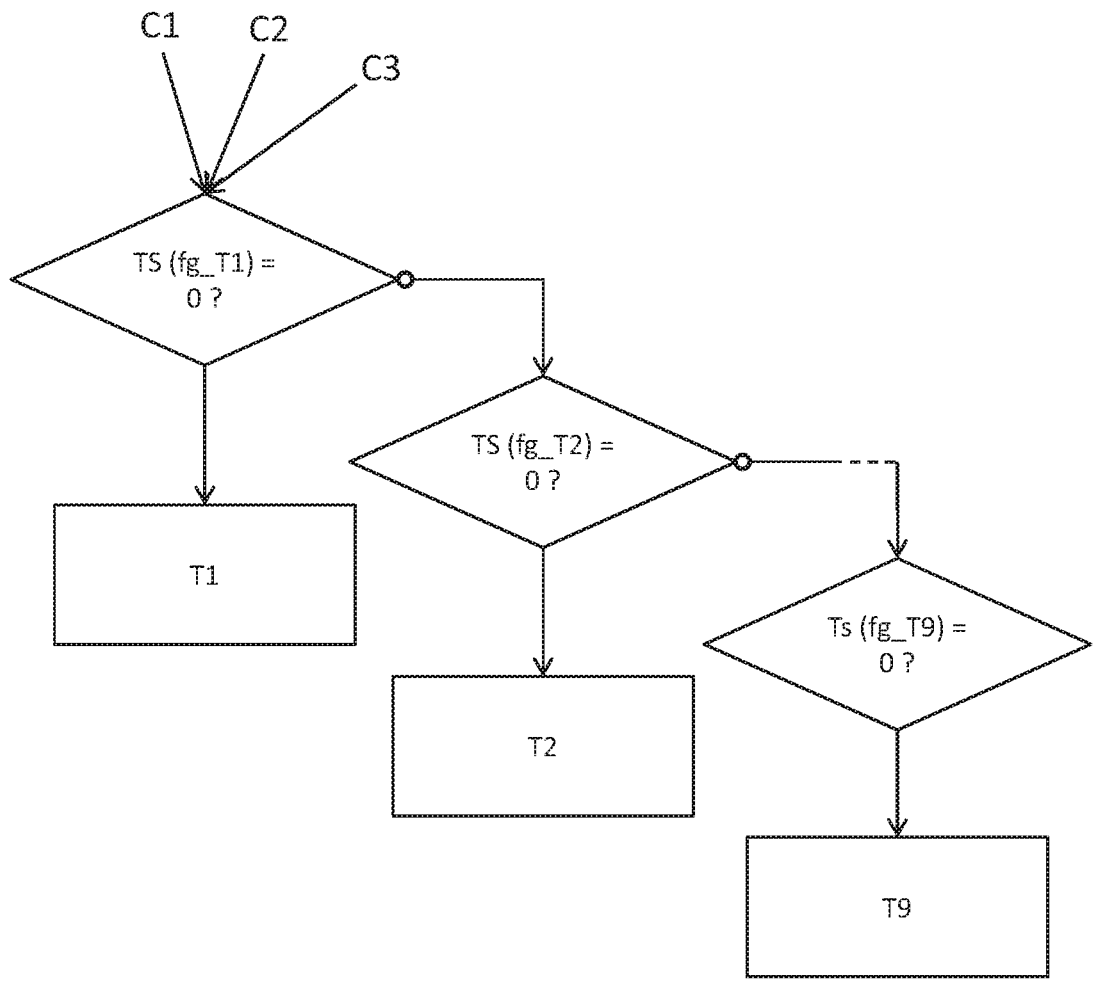
FIG. 6 illustrates one example of a common management task.

To ensure that a task designated by its identifier is T1, T2, T3, T4, T5, T6, T7, T8, T9 is processed by only one core, the indicator associated therewith is managed by means of an atomic function (i.e. an uncuttable, uninterruptable function) known as TEST_SET, and denoted by TS in the algorithm of FIG. 6, which tests the value of this flag, sets its value to 1 if it is at 0, and returns the value of this flag. Thus, if two cores simultaneously execute this atomic function TEST_SET (flag_ti), denoted by TS (fg_ti) in FIG. 6, as soon as the first core executes it, the flag_ti associated with task Ti switches to 1, the second core notices this flag at 1 and thus moves on to testing the next flag, as illustrated in FIG. 6. In the example of FIG. 5, the indicator (or flag; fg) associated with the identifier of each of tasks T1, T2 and T3 is changed from 0 to 1 when each of the three cores selects the identifiers of said tasks T1, T2, T3, respectively. Preferably, the method comprises initializing the indicators associated with each task, for example at the value 0, before implementing the one-off function FS.

Staying with the example of FIG. 5, the third core C3 finishes task T3 at a time $t_{11}$ before the first core C1 has finished executing task T1 and the second core C2 has finished executing task T2. The third core C3 then selects the identifier of the next task from the list which has not yet been assigned by choosing the first identifier on the list for which the associated indicator is at 0, in this instance the identifier of task T4, and implements said task T4.

Next, with the second core C2 having finished task T2 at a time $t_{12}$ while the third core C3 is still executing task T4 and the first core C1 is still executing task T1, said second core C2 then selects the identifier of the next task from the list which has not yet been assigned by choosing the first identifier on the list for which the associated indicator is at 0, in this instance the identifier of task T5, and implements said task T5.

Next, with the first core C1 having finished task T1 at a time $t_{13}$ while the second core C2 is still executing task T5 and the third core C3 is executing task T4, said first core C1 then selects the identifier of the next task from the list which has not yet been assigned by choosing the first identifier on the list for which the associated indicator is at 0, in this instance the identifier of task T6, and implements said task T6.

Next, with the second core C2 having finished task T5 at a time $t_{14}$ while the third core C3 is still executing task T4 and the first core C1 is still executing task T6, said second core C2 then selects the identifier of the next task from the list which has not yet been assigned by choosing the first identifier on the list for which the associated indicator is at 0, in this instance the identifier of task T7, and implements said task T7.

Next, with the third core C3 having finished task T4 at a time $t_{15}$ while the first core C1 is still executing task T6 and the second core C2 is still executing task T7, said third core C3 then selects the identifier of the next task from the list which has not yet been assigned by choosing the first identifier on the list for which the associated indicator is at 0, in this instance the identifier of task T8, and implements said task T8.

Next, with the first core C1 having finished task T6 at a time $t_{16}$ while the second core C2 is still executing task T7 and the third core C3 is executing task T8, said first core C1 then selects the identifier of the next task from the list which has not yet been assigned by choosing the first identifier on the list for which the associated indicator is at 0, in this instance the remaining identifier of task T9, and implements said task T9.

The method is thus implemented until all of the tasks have been selected for implementation. The detection (step E6) of the end of processing of all of the tasks leads to a return to the regular functions F1, F2, F3 (step E7). In other words, the implementation of the regular functions F1, F2, F3, put on hold prior to time $t_{10}$, is then picked up again at a time $t_{20}$ (step E7) once each of the cores C1, C2, C3 has finished processing the task it was processing and there are no more identifiers of tasks to be processed in the ordered list (i.e. all of the tasks have been processed and all of the "flag" indicators are at 1).

In the example of FIG. 5, once the third core C3 has finished executing task T8 and notices that there are no more identifiers to be selected from the ordered list (all of the flags are at 1), it falls idle and waits for the other cores to finish executing their tasks. Similarly, once the second core C2 has finished executing task T7 and notices that there are no more identifiers to be selected from the ordered list, it falls idle and waits for the other cores to finish executing their tasks. Once the first core C1 has finished executing task T9 and notices that there are no more identifiers to be selected from the ordered list (step E6), the implementation of the regular functions F1, F2, F3, put on hold prior to time $t_{10}$, is then picked up again (step E7) at a time $t_{20}$ on each of the three cores C1, C2, C3, respectively.

Between FIG. 1 of the prior art and FIG. 5 according to invention, it can thus be seen that there is a decrease in the processing time $(t_{20}-t_{10})<(t_2-t_1)$ for the same set of tasks T1, T2, T3, T4, T5, T6, T7, T8, T9.

It should be noted that, when the one-off function FS comprises fixed tasks TF1, TF2, TF3, the core C1, C2, C3 which is the first to finish executing its fixed task TF1, TF2, TF3 may launch the common management task TG and select the first task T1 from the list before the other cores each select the next available task from the list in turn.

The method according to the invention thus advantageously makes it possible to dynamically manage the distribution of tasks between the different cores so as to optimize the time taken by the computer to process a one-off function and thus make the system more responsive in returning to the processing of the regular functions.

The invention claimed is:

1. A method for managing a plurality of tasks of a one-off function implemented by a motor vehicle computer including a multicore microcontroller including a plurality of cores, each of the cores being configured to process a plurality of regular functions and a plurality of one-off functions, each of the one-off functions including a plurality of tasks to be executed in predetermined task order, each of the plurality of tasks being identified by an identifier, said method comprising, during processing of the tasks of a one-off function of the plurality of one-off functions:
   detecting a one-off event requiring implementation of the one-off function during execution of the regular functions by the plurality of cores;
   putting on hold the execution of the regular functions by the plurality of cores after detecting the one-off event;
   executing, by each core of the plurality of cores, a common management task that is configured to run through a predetermined ordered list of identifiers of the tasks of the one-off function and select the identifier of a first unprocessed task, which has not yet been processed by the other cores, from unprocessed tasks in the predetermined task order, each time a core of the plurality of cores becomes available to process a task, after detecting the one-off event and putting on hold the execution of the regular functions;
   processing, by the available core, the task that corresponds to the selected identifier; and
   when all of the tasks of the one-off function are finished being executed by the plurality of cores, restarting the execution of the regular functions by the plurality of cores,
   wherein the identifier of the first unprocessed task is selected by the available core after the available core has completed processing one of the tasks from a plurality of tasks being processed of the predetermined task order while at least one of the other cores is concurrently processing another task that has started processing of the tasks being processed in the predetermined task order other than the first unprocessed task.

2. The method as claimed in claim 1, wherein the common management function uses a binary variable for each of the tasks to indicate a state of handling of said respective task by one of the cores.

3. The method as claimed in claim 2, wherein the common management function uses an atomic function to manage updating the binary variable associated with each of the tasks.

4. The method as claimed in claim 3, further comprising initializing the binary variables prior to execution of the one-off function.

5. The method as claimed in claim 2, further comprising initializing the binary variables prior to execution of the one-off function.

6. The method as claimed in claim 1, wherein, when the available core selects the identifier of the first unprocessed task, an indicator associated with the identifier of the first unprocessed task is changed, and when the other cores examine the changed indicator, the other cores move to a next unprocessed task of the unprocessed tasks in the predetermined task order.

7. A computer for a motor vehicle, said computer comprising:
   a multicore microcontroller including a plurality of cores, each of the cores being configured to process a plurality of regular functions and a of one-off functions, each of the one-off functions including a plurality of tasks to be executed in a predetermined task order, each of the plurality of tasks being identified by an identifier, the multicore microcontroller being configured to
   detect a one-off event requiring implementation of the one-off function during execution of the regular functions by the plurality of cores, put on hold the execution of the regular functions by the plurality of cores after detecting the one-off event, execute, by each core of the plurality of cores, a common management task that is configured to run through a predetermined ordered list of identifiers of the tasks of the one-off function and select the identifier of a first unprocessed task, which has not yet been processed by the other cores, from unprocessed tasks in the predetermined task order, each time a core of the plurality of cores becomes available to process a task, after detecting the one-off event and putting on hold the execution of the regular functions, process, by the available core, said task that corresponds to the selected identifier, and when all of the tasks of the one-off function are finished being executed by the plurality of cores, restart the execution of the regular functions by the plurality of cores, wherein the identifier of the first unprocessed task is selected by the available core after the available core has completed processing one of the tasks from a plurality of tasks being processed of the predetermined task order while at least one of the other cores is concurrently processing another task that has started processing of the tasks being processed in the predetermined task order other than the first unprocessed task.

8. A motor vehicle comprising the computer as claimed in claim 7.

* * * * *